Aug. 26, 1969     B. G. TAYLOR ET AL     3,463,460
PNEUMATIC METHOD OF PRODUCING CEMENTING SLURRIES
Filed Dec. 29, 1966
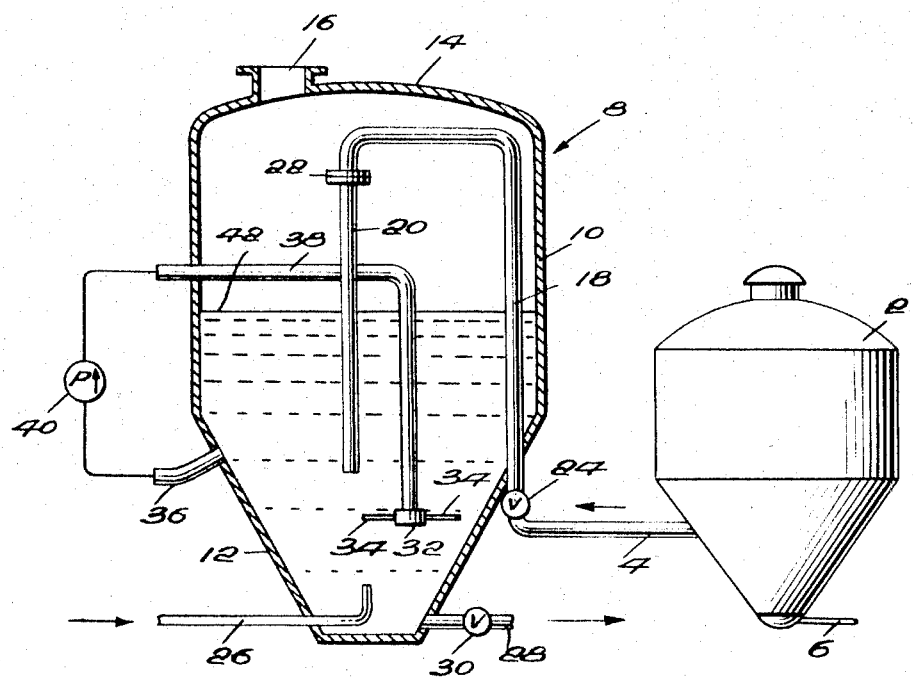
INVENTORS
BILL G. TAYLOR,
GLENN T. COLOMB,
BY
ATTORNEYS United States Patent Office 3,463,460
Patented Aug. 26, 1969

3,463,460
PNEUMATIC METHOD OF PRODUCING
CEMENTING SLURRIES
Bill G. Taylor, Dallas, and Glenn T. Colomb, Wichita Falls, Tex., assignors to Halliburton Company, Duncan, Okla., a corporation of Delaware
Filed Dec. 29, 1966, Ser. No. 605,686
Int. Cl. B28c 5/06, 7/04
U.S. Cl. 259—147                 14 Claims

ABSTRACT OF THE DISCLOSURE

A method and apparatus for preparing cementing slurries primarily for oil well operations. Water is placed in a mixing tank with an air jet near the bottom of the tank directing a stream of air bubbles upwardly through the tank. Dry pulverulent cement is conducted into the mixing tank where it mixes with the water to form a slurry. After thorough mixing, the entire contents of the tank may be pumped down a well.

BACKGROUND OF THE INVENTION

This invention relates to the preparation of cement slurries, and more particularly to a method and apparatus for mixing water and dry powdered hydraulic cement to produce cement slurries.

Hydraulic cement, such as portland cement, is mixed with water to produce a cement slurry. After a period of time, it hardens or sets to form concrete. In oil well operations, concrete is used to secure casing pipe in the well and ordinarily it is desirable for the cement slurry to set as quickly as possible after it has been pumped into the annular space between the casing and the bore hole wall. This permits subsequent drilling operations to proceed with a minimum of delay. In view of the time limitations, it is desirable for the mixing process to be carried out as quickly as possible, and yet for the cement to be thoroughly mixed with the water, so that a homogeneous slurry is formed. Large quantities of cement slurry are usually required in cementing casing and therefore the mixing apparatus must be capable of carrying out the mixing operation at a rapid rate.

One type of mixer that has been utilized widely for producing cement slurries at rapid rates is the jet-type mixer. This mixer includes a hopper above a mixer bowl and a water nozzle in position to direct a stream of water across the bowl toward a discharge pipe. Water is pumped at high pressure through the nozzle and the stream of water impinges on cement powder that drops from the hopper into the bowl, where it is mixed thoroughly with the water to form a slurry. From the discharge pipe, the slurry flows to a sump from which the cement slurry is drawn up by pumps. The slurry passes through the pumps and flows through the casing into the well. Jet mixers are capable of producing normal slurry at a rate of as much as 50 cubic feet per minute.

Although the jet mixer has been highly successful in meeting the need for rapid mixing of cement slurries for oil well casing, in certain situations the jet mixer is not entirely satisfactory. In the jet mixer process, the cement slurry is pumped into the well as the slurry is being produced. The density of the slurry, for example, is sometimes difficult to control under certain conditions. Precise blending and proportioning of additives is also sometimes difficult, particularly for small batches or amounts of cement. The density of the slurry that has been pumped down the well, for example, cannot be corrected.

Accordingly, it is an object of this invention to provide an improved method of preparing cement slurries.

It is a further object of this invention to provide a method and apparatus for mixing cement slurries while accurately controlling the weight of a particular batch or between different batches.

Another object of this invention is to provide a method and apparatus for preparing cement slurries that are very dense.

SUMMARY OF THE INVENTION

These objects are accomplished in accordance with a preferred embodiment of the invention by placing a measured quantity of water in a mixing tank, conducting a fluidized stream of cement particles into the water in the tank, and introducing a current of air under the water to agitate the cement particles and the water, thereby causing thorough mixing. The cement slurry may continue to be agitated by the current of air after all of the measured quantity of cement has been introduced into the tank. When the cement slurry is thoroughly mixed, it may be pumped out of the tank through an outlet at the bottom. The interior of the tank may be pressurized in order to assist in displacing the slurry through the outlet pipe. Increased agitation of the slurry in the mixing tank may be provided by revolving jets in the water through which the slurry is recirculated.

DESCRIPTION OF THE DRAWING

This preferred embodiment is illustrated in the accompanying drawing which shows schematically apparatus for preparing cement slurries in accordance with this invention.

DESCRIPTION OF THE PREFERRED EMBODIMENT

Referring to the drawing, dry, pulverulent cement is stored in a tank 2, which preferably is of the type having aerating apparatus for fluidizing the cement in the tank so that it can be discharged through a conduit 4. Typically, the tank 2 has an inlet pipe 6 for conducting air through aeration media to the interior of the tank 2. An example of a storage tank having aerating apparatus is disclosed in Pyle et al., No. 2,850,329.

A mixing tank 8 has cylindrical side walls 10 and sloping side walls 12 near the bottom of the tank. The side walls 12 are generally in the shape of a frustum of a cone. The top of the tank is covered by a dome 14 and a hatch 16 is preferably provided in the dome of the tank for the purpose of filling the tank and allowing the escape of air during the mixing process. The tank 8 has a cement pipe 18 which extends through the side wall thereof. The cement pipe 18 has a removable pipe section 20 which is joined to the pipe 18 by a union 22. The pipe union 22 permits the pipe section 20 to be separated from the cement pipe 18 for cleaning or for replacement. The cement pipe 18 may include a valve 24 and a coupling, not shown, joining together the ends of the pipe 18 and the conduit 4. The tank 8 also includes a pipe 26 for conducting air under presure into the interior of the tank. Preferably, the outlet end of the pipe 26 is offset from the lower end of the pipe section 20. An outlet pipe 28 at the bottom of the tank may be connected with a suitable pump for drawing the cement slurry out of the tank. A valve 30 is preferably provided to control the flow of the slurry through the outlet pipe 28.

Although the lower end of the pipe section 20 is shown as being submerged in the water, the end of the pipe may be spaced above the surface of the water, provided that air from the pipe 26, or other means, provides sufficient agitation of the water in the tank.

Additional agitation of the water and cement may be provided by a revolving head 32 having a plurality of jets 34 directed tangentially to cause rotation of the head 32 by reaction of the fluid passing out of the jets under pressure. Water or slurry is drawn out of the tank 8 through a pipe 36 and is conducted through a conduit 38 to the head 32 at a higher pressure after passing through a pump 40. The head 32 may be placed at any suitable location in the tank that provides sufficient agitation.

In carrying out the process of this invention, the discharge conduit 4 from the tank 2 is coupled to the end of the cement pipe 18. The tank 8 is partially filled with a predetermined quantity of water. The surface of the water is indicated at 42. The hatch 16 is preferably left open, so that the air above the water level 42 is approximately at atmospheric pressure. The valve 24 is opened and air is introduced into the interior of the storage tank 2 through the pipe 6. The cement in the tank 2 is fluidized and flows out of the tank 2 through the discharge conduit 4 and into the tank 8 through the cement pipe 18. The fluidized cement flows out at the lower end of the pipe section 20 where it mixes with the water in the tank. Air is introduced to the interior of the tank 8 through the pipe 26 and the air bubbles pass upwardly through the water to the water level 42. The movement of the air bubbles through the water, as well as the stream of aerated cement passing out of the lower end of the pipe section 20 cause agitation of the water and cement particles.

The quantity of cement introduced into the tank 8 through the pipe 18 depends upon the quantity of water required to mix with the cement to produce a slurry of a particular weight. After the cement has been introduced into the tank 8, the valve 24 is closed and the air pipe 6 may be shut off. Additional mixing may be obtained by continuing to inject air into the tank 8 through the pipe 26 and the movement of the air through the cement slurry causes mixing and blending of the constituents in the slurry. Also the slurry may continue to be recirculated through the revolving head 32. After sufficient mixing has been obtained, the hatch 16 may be closed, while continuing to inject air through the pipe 26. Sufficient pressure may then be built up in the tank 8 to displace the slurry through the outlet pipe 28 when the valve 30 is opened. In order to keep the slurry from becoming too aerated, it may be necessary to inject air at a point nearer the water level 42 during the pressurizing portion of the process.

Although a single storage tank 2 is shown in the drawings, several storage tanks may supply the cement for mixing a single batch in the tank 8. In this event, all of the cement is pumped from the first tank and then the cement pipe 18 and the section 20 are thoroughly purged with air to prevent a plug of hydrated cement from accumulating in the pipe.

Laboratory tests were conducted to show that the cement slurries produced in accordance with this invention compare favorably with slurries mixed by conventional processes. In the tests, control samples were produced by mechanical mixing with a Waring blendor in accordance with the procedures set forth in API RP 10B "Recommended Practice for Testing Oil-Well Cements and Cement Additives." Pneumatic mixing in accordance with this invention was accomplished using apparatus comparable to that illustrated in FIG. 1, but instead of a closed tank 8, the tank was in the form of a conical hopper with an open top. The air inlet pipe was positioned at the bottom of the hopper. A predetermined quantity of water was placed in the hopper and a corresponding quantity of cement was blown from the storage tank. The amount of water placed in the hopper initially was 10% less than the required amount. Air was bubbled up through the water by means of the air pipe at the bottom of the hopper. The air in the pipe was at a pressure of approximately 7 p.s.i.g. The cement was blown at an air pressure of between 6 and 15 p.s.i.g. from the storage tank into the hopper where it was mixed with the bubbling water until the slurry reached maximum weight. Since only 90% of the required mixing water was placed in the hopper, the weight of the slurry was usually above the design weight, so that it was necessary to add water in small increments to bring the weight down, or additional cement was blown into the hopper to bring the weight up to the desired value. Most of the cement was transferred from the storage tank into the hopper within about 10 minutes. The cement conduit was removed from the top of the mixing hopper and the slurry was agitated by a stream of bubbles passing upwardly from the air inlet at the bottom of the hopper. The initial sample for testing was taken at this time and samples were taken at intervals of 30 minutes thereafter.

The slurry weight was changed between sampling to provide data in the range of the designed weight, but differing slightly from it so that the effect of small changes could be studied. An increase in slurry weight from the sample preceding indicates additional cement was blown in between sampling, and a decrease in the slurry weight indicates a small increment of water was added to the slurry between sampling.

The following table indicates test results for Ideal Class A cement, without additives. The cement and water were mixed at a ratio of 5.2 gallons of water per sack of cement, which would produce a calculated slurry weight of 15.6 lbs. per gallon.

| Sample No. | Weight, lbs./gal. | | Viscosity, centipoise, 110° F. | |
|---|---|---|---|---|
| | 0 | 20 min. | 0 | 20 min. |
| | [1] 15.57 | 15.56 | 30 | 20 |
| | [1] 15.59 | 15.60 | 23 | 18 |
| | [1] 15.52 | 15.53 | 25 | 16 |
| 1 | 15.49 | 15.39 | 10 | 15 |
| 2 | 15.80 | 15.55 | 20 | 24 |
| 3 | 15.88 | 15.75 | 20 | 26 |
| 4 | 15.59 | 15.61 | 27 | 33 |
| 5 | 15.60 | 15.60 | 32 | 31 |
| 6 | 15.73 | 15.75 | 45 | 41 |
| 7 | 14.88 | 14.91 | 10 | 11 |
| 8 | 15.22 | 15.05 | 19 | 21 |
| 9 | 15.45 | 15.40 | 29 | 33 |
| 10 | 15.50 | 15.50 | 22 | 28 |

[1] Mixed with Waring Blendor.

Cement slurries were also prepared successfully in this laboratory apparatus with aditives such as CFR–2, a commercially available retarder; 12% gel, a weight reducer; Hi Dense No. 3, a weight increasing additive; a commercially available fluid less additive. Several different cements, including Victor, Trinity Inferno, Texcor, Starcor, which are commercially available oil well cements, were successfully mixed as described above.

Example 1

As a specific example of the preparation of cement slurry in accordance with this invention, a batch mix job was performed using 370 sacks of Texcor cement, 35% silica flour, 38 lbs. Hi-Dense No. 3 per sack of cement and 0.75% CFR–2. 40 barrels of water were placed in a tank as shown in FIG. 1 having a capacity of 820 cubic feet. The slurry was designed for a weight of 18.3 lbs. per gallon and the slurry would have a total volume of approximately 600 cubic feet. An air compressor having an output of approximately 470 cubic feet per minute supplied air for transferring the cement from the storage tank 2 and for the agitating air pipe 26. Substantially all of the cement was transferred from the storage tank 2 into the mixing tank 8 in approximately 50 minutes. The air flow through the cement conduit 18 was shut off and air flowed out of the agitating air pipe 26 at a sufficient rate to provide agitation of the slurry to prevent settling. Agitation by means of the air pipe was continued while the cement slurry was being withdrawn from the mixing tank 8. Although the air pipe outlet is in close proximity to the slurry outlet pipe 28, very little of the air from the discharge pipe 26 flowed through the outlet pipe. Furthermore, very little air entrainment was observed in the cement slurry. The resulting slurry had a relatively low viscosity. The lack of mechanical agitation of the slurry and the cooling effect of the air resulted in the slurry having a temperature of only 80° F. after completion of mixing. These characteristics are particularly favorable for oil well cementing operations.

Example 2

A cement blend of 125 sacks of Class E Texcor cement, 32.9 lbs. Silica Flour per sack, 28 lbs. Hi-Dense No. 3 per sack and 0.94 lb. (1%) CFR-2 per sack was mixed wtih water in the ratio of 5.19 gallons of water per sack of cement. The slurry had a design weight of 18 lbs. per gallon. With only 90% of the water, the slurry weight was calculated to be 18.6 lbs. per gallon. 90% of the required water (585 gallons) was placed in the mixing tank and the stream of fluidized cement was conducted into the water. The cement was transferred from a storage tank by aeration apparatus to form a fluidized stream of cement particles. The pressure in the storage tank varied between 15 and 28 p.s.i.g. during which the cement was being pumped from the tank. After 13 minutes, all of the cement blend was in the mixing tank. Agitation by means of the air jet in the mixing tank was continued to cause mixing of the slurry and samples were taken at 14 minutes, 22 minutes and 39 minutes after mixing had begun. The following is a table showing slurry weights and viscosity of the samples.

| Time | Sample | Slurry weight | | Viscosity, centipoise | |
|---|---|---|---|---|---|
| | | 0 | 20 min. | 0 | 20 min. |
| 14 | 1 top | 18.60 | 18.63 | 18 | 23 |
| 14 | 2 bot | 18.50 | 18.51 | 18 | 20 |
| 22 | 3 top | 18.62 | 18.64 | | |
| 22 | 4 bot | 18.62 | 18.62 | | |
| 39 | 5 top [1] | 18.0 | 18.02 | 6 | 7 |
| 39 | 6 bot [1] | 18.0 | 17.91 | 8 | 7 |

[1] These samples were taken after 100% of water was added to slurry.

The cement slurry was mixed well with no lumps. The slurry was considered to be satisfactorily mixed after 14 minutes. No noticeable settling of the Hi-Dense additive occurred in the samples that were taken; however, a noticeable amount of settling was present after the air agitation had been discontinued for several minutes.

It has been found hat the process of producing slurries by pneumatically mixing the water and cement is particularly advantageous since the compressed air at modest volumes and pressures and without special fittings provides adequate energy for thoroughly mixing of cement slurries. The slurry weight can be very closely controlled within a particular mix and between mixes, since the entire slurry is mixed before it is pumped down the well. Heavy slurries can be mixed even when slurry consistency exceeds that normally considered pumpable. It was also discovered that additives that sometimes cause foam when mixed with a conventional jet mixer cause almost no foam when mixed with a pneumatic mixer in accordance with this process. Examples of such additives are salt and LA-2, a fluid loss additive. Thickening times and compressive strengths are generally the same as those measured for slurries produced by conventional mixing.

Generally, the method of producing cement slurries in accordance with this invention gives satisfactory results with substantially all of the classes of cements that are commonly used. The additives, particularly those used in oil well operations, appear to perform as well as, if not better than, when the slurry is mixed by conventional methods.

We claim:

1. A method of producing a cement slurry comprising: confining a quantity of water in a mixing zone, conducting a stream of substantially dry cement into said mixing zone while agitating said water and cement in the mixing zone by a current of gas.

2. The method of producing cement slurry according to claim 1 wherein said water is confined in a tank, and including conducting said gas into said tank near the bottom of said mixing zone, whereby the gas bubbles pass upwardly through the mixing zone.

3. The method according to claim 2 wherein said tank has sides sloping inwardly toward the bottom and said current of gas is introduced into said tank near said bottom, whereby the sloping sides direct the circulation of slurry into the mixing zone.

4. The method according to claim 2 including pumping said cement slurry out of said tank, said air above said water surface being above atmospheric pressure, whereby the air pressure assists in pumping the slurry out of the tank.

5. The method of producing cement slurry according to claim 1 wherein a predetermined quantity of cement is conducted into said mixing zone to form a slurry with said quantity of water.

6. The method according to claim 1 wherein said cement stream is conducted into said tank through a conduit in a fluidized condition.

7. The method according to claim 6 wherein the outlet of said cement conduit is immersed in said water.

8. The method according to claim 1 wherein said water and cement are circulated from said mixing zone and sprayed under pressure into said mixing zone.

9. The method of producing cement slurry comprising: confining a quantity of water in a mixing zone, conducting a stream of cement into said mixing zone, and agitating said water and cement in the mixing zone by a current of gas, said water being confined in a tank with a quantity of air above the surface of the water, said cement stream entering the mixing zone below the surface of the water.

10. Apparatus for producing cement slurries comprising a stationary mixing tank having a top and bottom, a gas conduit having an outlet adjacent the bottom of said tank, means for introducing dry pulverulent cement into said tank, and hatch means in the top of said tank for separately introducing liquids into said tank, whereby when said tank if filled with water through said hatch means the gas flowing from said outlet agitates cement and water to produce a slurry.

11. Apparatus according to claim 10 including means for drawing a portion of said slurry from said tank and directing said portion under pressure into said tank for agitating said slurry in said tank.

12. Apparatus for producing cement slurries comprising a mixing tank, a gas conduit having an outlet adjacent the bottom of said tank, means for introducing dry pulverulent cement into said tank, said cement introducing means including means for fluidizing said cement, a conduit extending through the wall of said tank, and means causing said fluidized cement to flow into said tank through said conduit, whereby when said tank is filled with water, the gas flowing from said outlet agitates cement and water in the tank to produce a slurry.

13. Apparatus according to claim 12 wherein said tank has side walls sloping inwardly toward the bottom of the tank whereby the side walls encourage circulation of the slurry in cooperation with the gas flowing from said outlet.

14. Apparatus according to claim 12 wherein said tank includes means for sealing gas in said tank, and an outlet pipe adjacent the bottom of said tank, whereby the interior of said tank may be pressurized.

References Cited

UNITED STATES PATENTS

| | | | |
|---|---|---|---|
| 806,214 | 12/1905 | Trent | 259—151 |
| 1,559,666 | 11/1925 | Bernier | 259—151 |
| 1,769,275 | 7/1930 | Rice | 259—147 X |
| 2,238,051 | 4/1941 | Hackley | 259—151 |
| 3,326,535 | 6/1967 | Clerck | 259—147 |

ROBERT W. JENKINS, Primary Examiner

U.S. Cl. X.R.

259—165